US012603946B2

(12) United States Patent
Singh et al.

(10) Patent No.: US 12,603,946 B2
(45) Date of Patent: Apr. 14, 2026

(54) IN-BAND SERVICE CHAINING IN A DISTRIBUTED SERVICES ENVIRONMENT

(71) Applicant: INTERNATIONAL BUSINESS MACHINES CORPORATION, Armonk, NY (US)

(72) Inventors: Anand Singh, Apex, NC (US); Erich Nahum, New York, NY (US); Dylan J Brisco, Cary, NC (US); Douglas Alan Larson, Raleigh, NC (US); Vijay Kestur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 18/644,483

(22) Filed: Apr. 24, 2024

(65) Prior Publication Data

US 2025/0337818 A1      Oct. 30, 2025

(51) Int. Cl.
 *H04L 67/60*          (2022.01)
(52) U.S. Cl.
 CPC .................................... *H04L 67/60* (2022.05)
(58) Field of Classification Search
 None
 See application file for complete search history.

(56) References Cited

U.S. PATENT DOCUMENTS

| | | | |
|---|---|---|---|
| 10,063,415 B1 * | 8/2018 | Kanakarajan | ....... H04L 41/0806 |
| 10,361,969 B2 | 7/2019 | Bosch | |
| 10,841,256 B2 | 11/2020 | Ahuja | |
| 10,938,677 B2 | 3/2021 | Shimamura | |
| 11,240,126 B2 | 2/2022 | Makwarth | |
| 11,526,413 B2 | 12/2022 | Barnsteiner | |
| 2007/0027974 A1 * | 2/2007 | Lee | .......... H04L 43/16 |
| | | | 709/223 |
| 2015/0195197 A1 | 7/2015 | Yong | |
| 2023/0291634 A1 | 9/2023 | Rao | |
| 2023/0409388 A1 * | 12/2023 | Scarfutti | ................. G06F 16/88 |

OTHER PUBLICATIONS

Jaeger, "Jaeger: Open source, distributed tracing platform", accessed on Apr. 24, 2024, 5 pages, https://www.jaegertracing.io/.

(Continued)

*Primary Examiner* — Natisha D Cox
(74) *Attorney, Agent, or Firm* — Eric W. Chesley

(57)                    ABSTRACT

Described are techniques for in-band service chaining. The techniques include generating a topic chain for a service request that spans a set of service nodes in a distributed services environment. The topic chain indicates a sequence of topics to publish the service request so as to provide the service request to the set of service nodes via the sequence of topics. The techniques further include publishing the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes.

20 Claims, 8 Drawing Sheets

(56)                        References Cited

OTHER PUBLICATIONS

Medhat et al., "Service Function Chaining in Next Generation Networks: State of the Art and Research Challenges", Accepted From Open Call, IEEE Communications Magazine, Feb. 2017, pp. 216-223.

Richardson, Microservice Architecture, "Pattern: Distributed Tracing", accessed on Feb. 22, 2024, 4 pages, https://microservices.io/patterns/observability/distributed-tracing.html.

Sigelman et al., "Dapper, a Large-Scale Distributed Systems Tracing Infrastructure", Google Technical Report dapper-2010-1, Apr. 2010, 14 pages.

Zipkin, "Tracers and Instrumentation", accessed on Apr. 24, 2024, 1 page, https://zipkin.io/pages/tracers_instrumentation.

International Searching Authority, "Notification of Transmittal of the International Search Report and the Written Opinion of the International Searching Authority, or Declaration," Patent Cooperation Treaty, Jun. 25, 2025, 11 pages, International Application No. PCT/IB2025/054001.

* cited by examiner

600

---

602
GENERATE A TOPIC CHAIN FOR A SERVICE REQUEST THAT SPANS A SET OF SERVICE NODES IN A DISTRIBUTED SERVICES ENVIRONMENT, WHERE THE TOPIC CHAIN INDICATES A SEQUENCE OF TOPICS IN A MESSAGE BUS TO PUBLISH THE SERVICE REQUEST SO AS TO PROVIDE THE SERVICE REQUEST TO THE SET OF SERVICE NODES BY WAY OF THE SEQUENCE OF TOPICS

---

604
PUBLISH THE SERVICE REQUEST AND THE TOPIC CHAIN IN A MESSAGE TO A FIRST TOPIC INDICATED BY THE TOPIC CHAIN TO PROVIDE THE SERVICE REQUEST AND THE TOPIC CHAIN TO A FIRST SERVICE NODE IN THE SET OF SERVICE NODES, AND TO ALLOW THE FIRST SERVICE NODE TO SUBSEQUENTLY PUBLISH THE MESSAGE TO A SECOND TOPIC INDICATED BY THE TOPIC CHAIN, SO AS TO PROVIDE THE SERVICE REQUEST AND TOPIC CHAIN TO A SECOND SERVICE NODE IN THE SET OF SERVICE NODES.

| 702 |
| --- |
| EXTRACT TRACING INFORMATION FOR A SERVICE REQUEST FROM A MESSAGE AFTER COMPLETING AT LEAST A PORTION OF THE SERVICE REQUEST, WHERE INDIVIDUAL SERVICE NODES IN A SET OF SERVICE NODES INSERT THE TRACING INFORMATION INTO THE MESSAGE TO TRACK AND RECORD ACTIVITIES OF THE INDIVIDUAL SERVICE NODES |

| 704 |
| --- |
| LOG THE SERVICE REQUEST USING THE TRACING INFORMATION EXTRACTED FROM THE MESSAGE |

IN-BAND SERVICE CHAINING IN A DISTRIBUTED SERVICES ENVIRONMENT

BACKGROUND

The present disclosure relates to distributed services systems, and, more specifically, to service orchestration in a distributed services system.

Distributed services represent an architectural approach that distributes application functionalities and computing resources across different nodes or machines. For example, a software application can be broken down into smaller, independent services. Each of these services can be designed to perform a specific function of the application. For example, instead of building a monolithic application, microservices can be implemented to perform specific functionalities of the application. Each microservice can execute its own unique process, maintain its own database, etc. This isolation allows for easier maintenance, testing, and scalability of the application.

SUMMARY

Aspects of the present disclosure are directed toward a computer-implemented method that comprises generating a topic chain for a service request that spans a set of service nodes in a distributed services environment, where the topic chain indicates a sequence of topics to publish the service request so as to provide the service request to the set of service nodes by way of the sequence of topics. The computer-implemented method further comprises publishing the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 6 a flow diagram that illustrates an example method for in-band service chaining using a topic chain, in accordance with some embodiments of the present disclosure.

FIG. 7 is a flow diagram illustrating an example method for logging service requests in association with performing the in-band service chaining described in FIG. 6, in accordance with some embodiments of the present disclosure.

Figure 1:
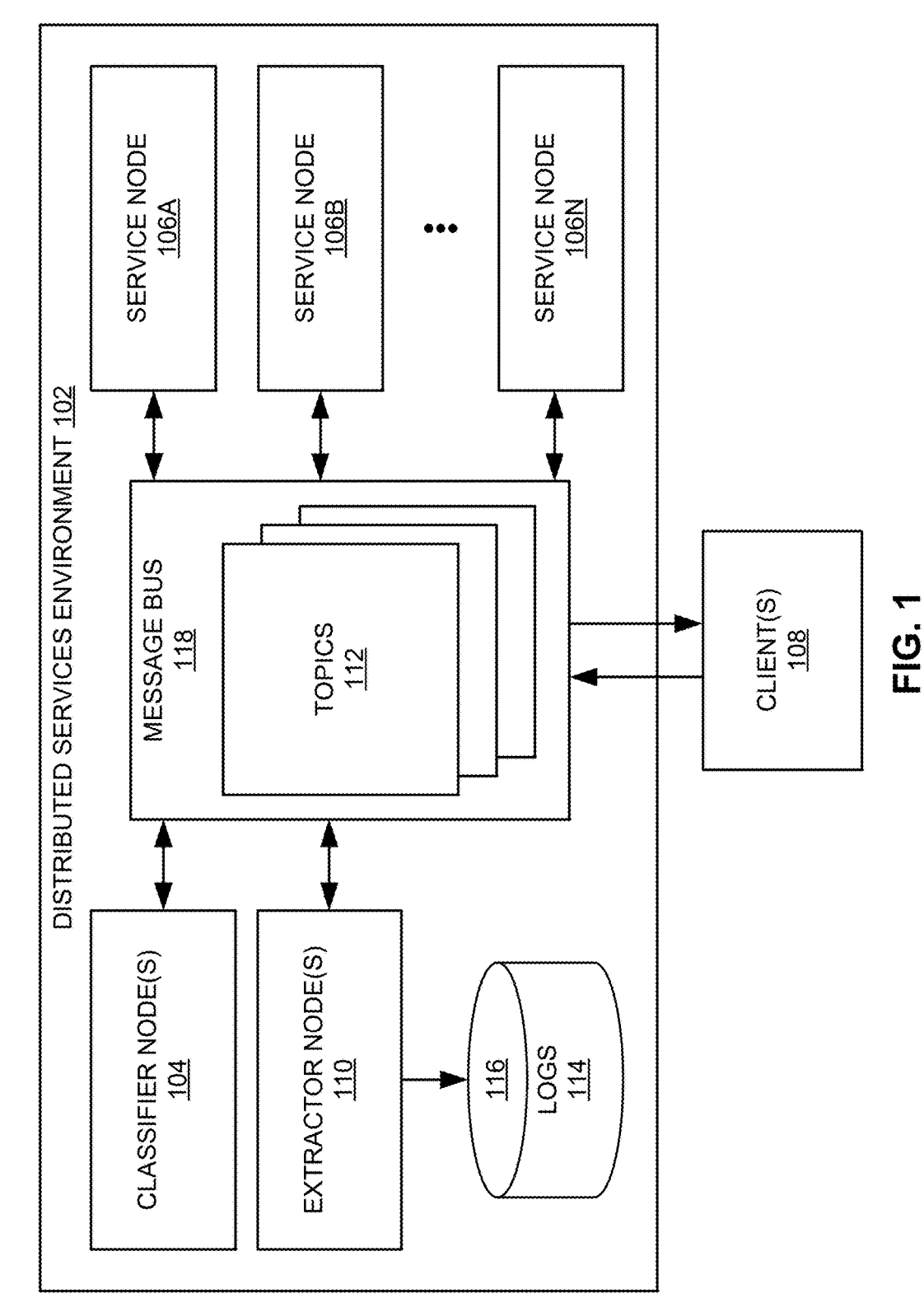
FIG. 1 is a block diagram illustrating an example system implementing in-band service chaining in a distributed services environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward in-band service chaining in a distributed services environment. While not limited to such applications, embodiments of the present disclosure may be better understood in light of the aforementioned context.

In a distributed services environment, the functionality of an application can be divided into a number of services (e.g., microservices), where each service (referred to herein as a service node) comprises an independent component that performs a specific function or action, such as user authentication, data retrieval, logging, or some other functionality. Clients, such as a web browser, a mobile application, or another service, generate service requests that span multiple service nodes. Each service node involved performs an individual function or action that together accomplish the service request. As an illustration, a service request to retrieve data can span a first service node that authenticates the client, a second service node that retrieves the data from a database, and a third service node that formats the data based on client specifications.

Message-based communication provides an efficient and decoupled technique for communicating service requests that span multiple service nodes. Unlike direct HTTP communication, where services communicate directly with one another, message-based communication utilizes asynchronous messaging. One architecture for communicating service requests to service nodes is a message bus-based architecture. A message bus is a communication infrastructure that facilitates the exchange of messages between different service nodes. The message bus-based architecture can comprise a publish/subscribe (or pub/sub) model or a message queue model. In the publish/subscribe model senders (publishers) publish messages to specific topics or message queues, and service nodes subscribe to the topics to receive the messages. A topic is a named entity that represents a feed of messages, and a subscription is a named entity that has an interest in receiving messages on a particular topic. In the message queue model, messages are stored on a message queue until the messages are processed and deleted. Each message in a message queue is processed once by a single consumer (e.g., service node).

In some ways, the use of a message bus-based architecture in a distributed services environment can pose challenges. One challenge is when the service nodes included in a service request span are hardcoded to communicate with each another via topics. For example, the application logic of a first service node can be hardcoded to publish a message to a particular topic, and the application logic of a second service node can be hardcoded to obtain the message from the particular topic. The hardcoding of topics in the application logic of the service nodes results in a rigid architecture across the span of the service request, which makes modifying the span of the service request (e.g., adding/removing service nodes from the span of the service request) difficult because the application logic of each service node must be modified.

Advantageously, aspects of the present disclosure overcome the challenges above by generating a topic chain for a service request and including the topic chain in a message to instruct the service nodes in the service request span to forward the message to the topics indicated in the topic chain. By including the topic chain in the message used to communicate the service request to the service nodes, hardcoding of the topics in the application logic of the individual service nodes is avoided. These advantages, as well as other advantages of the present disclosure are described below.

According to an aspect of the present disclosure, there is provided a computer-implemented method comprising generating a topic chain for a service request that spans a set of service nodes in a distributed services environment, where the topic chain indicates a sequence of topics to publish the service request so as to provide the service request to the set of service nodes by way of the sequence of topics. The computer-implemented method further comprising publishing the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes. Advantageously, the use of a topic chain to provide a service request to a set of service nodes reduces dependency between the service nodes. This increases flexibility within the distributed services environment to allow the service nodes to be utilized for more than one category of service request, which may reduce the number of service nodes needed in the distributed service, and consequently, reduce an amount of computational resources needed to process service requests.

According to an aspect of the computer-implemented method, generating the topic chain for the service request further comprises identifying a rule list that corresponds to the service request, where the rule list defines the sequence of topics for publishing the service request to allow the set of service nodes to accomplish the service request and generating the topic chain to indicate the sequence of topics defined by the rule list. Advantageously, the use of the rule list enables a service requests span to be modified without having to modify the application logic of each individual service node involved in the service request span. This allows the service nodes in the distributed services environment to be utilized for more than one category of service request, which may reduce the number of service nodes needed in the distributed service, and thereby reduce an amount of computational resources needed to process service requests.

According to an aspect of the computer-implemented method, generating the topic chain for the service request further comprises obtaining status information for service nodes in the distributed services environment, selecting individual service nodes to handle aspects of the service request based on the status information, identifying topics to which the individual service nodes subscribe, and generating the topic chain to indicate the topics. Advantageously, topic chains can be dynamically generated based on the health of service nodes in the distributed services environment. Dynamically generating a topic chain for a service request can improve performance of the service request by decreasing an amount of time to perform the service request and/or decreasing an amount of computational resources used to perform the service request.

According to an aspect of the computer-implemented method, generating the topic chain for the service request further comprises generating the topic chain at a classifier node implemented in the distributed services environment to generate topic chains for service requests, where the service requests are provided to the classifier node by way of a topic to which the classifier node subscribes. Advantageously, implementing a classifier node in the distributed services environment to generate topic chains for service requests realizes the previously described advantages of using topic chains to forward service requests to a span of service nodes.

According to an aspect of the computer-implemented method, generating the topic chain for the service request further comprises generating the topic chain at a service node included in the set of service nodes, where the service node is configured to act as both a service node to provide a microservice and a classifier to generate topic chains for service requests. Advantageously, implementing a classifier in a service node to generate topic chains for service requests can reduce or eliminate the need for individual classifier nodes, which potentially makes computational resources in the distributed services environment available for other purposes.

According to an aspect of the computer-implemented method, publishing the service request and the topic chain further comprises incorporating the topic chain in metadata of the message for publishing the service request to the set of service nodes. Advantageously, including a topic chain in message metadata realizes the previously described advantages of using topic chains to forward service requests to a span of service nodes.

According to an aspect of the computer-implemented method, publishing the service request and the topic chain further comprises incorporating the topic chain in a payload field of the message of the service request as key-value pairs. Advantageously, including a topic chain as key-value pairs in a message payload realizes the previously described advantages of using topic chains to forward service requests to a span of service nodes.

According to an aspect of the computer-implemented method, the method further comprises receiving, at a service node in the set of service nodes, the message containing the service request and the topic chain, performing an aspect of the service request that corresponds to the service node, identifying a next topic in the topic chain, and publishing the message containing the service request and the topic chain to the next topic. Advantageously, configuring a service node to identify the next topic in the topic chain enables the service node to forward the message to a next service node in the service node span, thereby realizing the previously described advantages of using topic chains to forward service requests to a span of service nodes.

According to an aspect of the computer-implemented method, identifying the next topic in the topic chain further comprises modifying, by the service node, the topic chain to indicate remaining topics in the topic chain to which the message has yet to be published. Advantageously, configuring a service node to modify the topic chain to only indicate the remaining topics enables a next service node in the service node span to identify the next topic in the topic chain, which contributes to realizing the previously described advantages of using topic chains to forward service requests to a span of service nodes.

According to an aspect of the computer-implemented method above, the method further comprises inserting, by the service node, tracing information into the message, where the tracing information tracks and records activities of the service node related to performing the service request. Advantageously, tracing information generated by the service nodes can be aggregated into a single message instead of generating and storing the tracing information in individual service node logs, which may reduce an amount of computational resources needed to generate, process, and store the tracing information.

According to an aspect of the computer-implemented method above, the method further comprises extracting, at an extractor node, the tracing information for the service request from the message after at least a portion of the service request has been completed and logging the service request using the tracing information extracted from the message. Advantageously, the tracing information can be maintained in the message until the extractor node extracts the tracing information from the message for logging. This avoids having to store and maintain individual logs generated by the service nodes and having to stitch the tracing information together to create a single log for the service request, which can reduce an amount of computational resources needed to log the service request.

According to an aspect of the present disclosure, there is provided a computer-implemented method comprising generating a topic chain for a service request that spans a set of service nodes in a distributed services environment, where the topic chain indicates a sequence of topics to publish the service request so as to provide the service request to the set of service nodes by way of the sequence of topics. The computer-implemented method further comprising publishing the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes. The computer-implemented method further comprising receiving, at a service node included in the set of service nodes, the message containing the service request and the topic chain, performing an aspect of the service request that corresponds to the service node, inserting by the service node tracing information into the message, where the tracing information tracks and records activities of the service node related to performing the service request, and publishing the message containing the tracing information to a next topic in the topic chain. The computer-implemented method further comprising receiving the message containing the tracing information at an extractor node after at least a portion of the service request has been completed, extracting the tracing information for the service request from the message, and logging the service request using the tracing information extracted from the message. Advantageously, the aforementioned computer-implemented method realizes the associated advantages, improvements, and/or technical effects, previously described.

Additional aspects of the present disclosure are directed to systems configured to perform any of the functionality of any of the aspects of the aforementioned computer-implemented method, thereby realizing the associated advantages, improvements, and/or technical effects, previously described. Also, additional aspects of the present disclosure are directed to computer program products comprising one or more computer readable storage media, and program instructions collectively stored on the one or more computer readable storage media, the program instructions configured to cause one or more processors to perform any of the functionality of any of the aspects of the aforementioned system, thereby realizing the associated advantages, improvements, and/or technical effects, previously described.

Aspects of the present disclosure can be relevant to multiple technical use cases. In one example technical use case, the computer-implemented method described above can be used to perform in-band service chaining for microservices configured to communicate using an MQ (Messaging Queue) messaging system. For example, a classifier node can subscribe to a service request topic managed by the MQ messaging system to receive service requests directed to a span of microservices. The classifier node evaluates a service request to determine a sequence of service nodes to perform the service request, generates a topic chain for the service request, and publishes a message containing the service request and topic chain to the first topic in the topic chain managed by the MQ messaging system. Thereafter, the service nodes, in the order established by the topic chain, receive the message, perform their part of the service request, and forward the message to the next topic in the topic chain. Advantageously, the message containing the service request is exchanged between service nodes using the MQ messaging system as indicated by the topic chain, such that communication between the service nodes is flexible enough to allow the service nodes to be utilized for more than one category of service request.

Referring now to the figures, FIG. 1 illustrates a block diagram of an example system 100 that can implement in-band service chaining in a distributed services environment 102, in accordance with some embodiments of the present disclosure. As illustrated, components of the distributed services environment 102 can include a plurality of service nodes 106A, 106B, 106N (collectively 106, where N can refer to any positive integer representing any number of service nodes), a message bus 118 for managing topics 112, one or more classifier nodes 104, one or more extractor nodes 110, a log datastore(s) 116, and other components as will be appreciated.

The components of the system 100 perform in-band service chaining to accomplish service requests that span multiple service nodes 106. In-band service chaining refers to a technique for sequentially connecting multiple service nodes 106 that provide different services (e.g., microservices) to create an end-to-end service. For example, when a service request requires that multiple service nodes 106 work together to perform the service request, the execution of the service nodes 106 can be orchestrated to accomplish the service request. The output of one service node 106 can be the input for the next service node 106 in a chain or span of service nodes 106. As a non-limiting illustration, a service request that places an order with an ecommerce retailer can involve performing several tasks sequentially, such as verifying a customer's identity, performing an inventory check to ensure that a product is in stock, processing payment and updating the status of the order, and arranging shipment of the product to the customer.

Aspects of the present disclosure accomplish in-band service chaining by connecting a span of service nodes 106 using a topic chain. A span of service nodes 106, as used herein, refers to an end-to-end sequence of service nodes 106 providing services (e.g., microservices) that perform individual tasks to accomplish a service request. A topic chain, as used herein, refers to information specifying a sequence of topics 112 for publishing a service request so as to provide the service request to a span of service nodes 106 that accomplish the service request. A service request, as used herein, comprises a request from a client 108 to perform a service, task, and/or action, where the client 108 can be an individual user, a computer, an application, and/or another service. A service request span, as used herein, refers to an end-to-end sequence of tasks that are performed to accomplish a service request.

The service nodes 106 illustrated in FIG. 1 comprise individual, self-contained, and loosely coupled microservices configured to perform specific functions. A service node 106, as referred to herein, is an instance of a service, which can include a microservice. The service nodes 106 perform their specific functions in response to service requests from clients 108 and/or other services. Service requests are communicated to, and between, the service nodes 106 using messages published to topics 112 managed by a message bus 118. In some embodiments, the distributed services environment 102 can include a plurality of service nodes 106 that are instances of a single microservice. As an illustrative example, the distributed services environment 102 can include a plurality of service nodes 106 that are instances of a single microservice, such as a billing service, a customer account service, a warehouse management service, or another microservice, such that service requests can be distributed (e.g., via load balancing) between the instances of the microservice. As will be described in greater detail later, in addition to providing an instance of a microservice, a service node 106 included in a span of service nodes read a topic chain included in a message to identify a next topic in the topic chain to forward the message, and publish the message to the next topic.

The message bus 118 comprises a communication infrastructure configured for exchanging messages between the components of the distributed services environment 102 and the clients 108 of the distributed services environment 102. In some embodiments, the message bus-based architecture of the message bus 118 comprises a publish/subscribe model. In this type of model, senders (publishers) publish messages to topics 112, and receivers (subscribers) subscribe to the topics 112. In other embodiments, the message bus-based architecture of the message bus 118 comprises a message queue model. In this type of model, the message queue facilitates asynchronous communication between components of the distributed services environment 102, where the message queue acts as an intermediary for transmitting messages published to topics 112 between the components. Messages are stored in the message queue until they can be processed by the intended recipient. One example of a message queue model is the MQ (Messaging Queue) messaging system. The MQ messaging system facilitates asynchronous communication between service nodes 106. The MQ messaging system acts as an intermediary, allowing service nodes 106 to exchange messages without needing to be aware of each other's ability or specifics.

The topics 112 managed by the message bus 118 serve as named channels or categories to which messages are published. The topics 112 act as intermediary channels between publishers (message senders) and subscribers (message recipients). The topics 112 categorize messages for delivery to subscribers of the topics 112. As a non-limiting illustration, a topic called "customer-orders" can be used to categorize messages containing customer order information, such that a publisher can send a message to the "customer-orders" topic when a new order is placed, and a subscriber (e.g., billing service, customer account service, warehouse management service) can receive the message published to the "customer-orders" topic.

As mentioned earlier, aspects of the present disclosure perform in-band service chaining by connecting a span of service nodes 106 using a topic chain. Topic chains for service requests can be generated by one or more classifiers that evaluate a service request and determine a sequence of topics 112 for publishing the service request so as to provide the service request to a span of service nodes 106 that subscribe to the topics. In some embodiments, a classifier can be implemented as an independent classifier node 104 in the distributed services environment 102 to generate topic chains for services requests. In other embodiments, as will be described later in association with FIG. 3, a classifier can be implemented as a module in a service node 106, such that the service node 106 acts as both a service of a distributed application and a classifier for generating topic chains for service requests.

In some embodiments, a classifier generates a topic chain for a service request using a rule list. Rule list generation of topic chains comprises matching a service request to a rule list specifying a sequence of topics (subscribed to by services) for accomplishing the service request. A rule list can be configured by a system administrator who creates the rule list to indicate a sequence of topics and associates the rule list to a class of service requests. As an example, the rule list can sequentially indicate a first topic for publishing a service request so as to provide the service request to a first service node 106A; a second topic for publishing the service request so as to provide the service request to a second service node 106B; and so on. A classifier can be provided access to a rule list repository (not shown), and in response to receiving a service request, the classifier can query the rule list repository to identify a rule list that corresponds to the service request.

In some embodiments, a classifier dynamically generates a topic chain for a service request. Dynamic generation of a topic chain comprises identifying a set of service nodes 106 to handle a service request and generating the topic chain to indicate a sequence of topics to which the service nodes 106 subscribe. In the context of a distributed application, the distributed services environment 102 can simultaneously handle multiple service requests for the application by distributing the service requests (e.g., via load balancing) to service nodes 106 that are instances of a microservice configured to perform a particular aspect of the application (e.g., a billing service, a customer account service, etc.). The goal is to balance the load of service requests to prevent any one of the service node 106 from becoming overwhelmed, as well as to prevent sending service requests to service nodes 106 that are unable to handle the service requests (e.g., failed service nodes).

The classifier can participate in optimizing the performance of a distributed application by dynamically generating topic chains. In particular, in some embodiments, the classifier evaluates a service request to determine a span of service nodes 106 for accomplishing the service request and identifies service nodes 106 that are capable of handling the aspects of the service request. In some embodiments, evaluating the service request to determine a span of service nodes 106 for accomplishing the service request can include referencing a table (not shown) that maps categories of service requests to microservices configured to perform aspects of the service requests, as well as indicates a sequence in which the microservices perform the aspects of the service requests. As an example, the table can map a category of service request (e.g., customer-order) to a first microservice (e.g., customer-service) that performs a first aspect of the service request (e.g., generates an order), a second microservices (e.g., billing service) that performs a second aspect of the service request (e.g., charge the customer), a third microservice (e.g., warehouse management service) that performs a third aspect of the service request (e.g., initiate shipping of a product), and indicate an order of performance of the microservices (e.g., customer-service→billing-service→warehouse-management-service).

After identifying the microservices for performing the service request and the order of performance of the microservices, the classifier identifies service nodes 106 in the distributed services environment 102 that provide the microservices needed for the service request and are capable of handling the service request. In some embodiments, the classifier obtains status information for service nodes 106 from a control plane (not shown) that manages the service nodes 106. The status information can indicate a health (e.g., a ready status, a disk status, a memory status, a process capacity status, a network status, etc.) of the service nodes 106. The classifier evaluates the statuses of the service nodes 106 using the status information and selects the service nodes 106 that are able to handle the service request.

In some embodiments, in addition to identifying service nodes 106 that are capable of handing the service request, the classifier further determines which of the service nodes 106 are likely to optimize performance of the service request (e.g., decrease a time to perform the service request, decrease an amount of computing resources used to perform the service request, etc.). For example, the classifier can evaluate the statuses of the service nodes 106 using the status information obtained from the control plane to identify service nodes 106 that are expected to perform better as compared to other service nodes 106.

After selecting a span of service nodes 106 to perform the service request, the classifier identifies topics 112 to which the service nodes 106 subscribe, and the classifier generates a topic chain to indicate a sequence of the topics 112 used to provide the service request to the span of service nodes 106. For example, in a distributed application architecture, the distributed services environment 102 can include multiple clusters of service nodes 106 providing microservices, and each cluster can include a message bus 118 for providing service requests to service nodes 106 included in the cluster. Accordingly, when dynamically generating a topic chain, the classifier identifies a topic 112 managed by a message bus 118 located in a cluster that hosts a service node 106 selected to handle the service request. The classifier can do this for each service node 106 included in the span of service nodes 106 selected to handle the service request.

In some embodiments, a service request span can include more than one classifier (or an evaluation performed by a same classifier). In these embodiments, an additional classifier (or evaluation) can be added to the service request span to evaluate the statuses of remaining service nodes 106 in a span of service nodes 106 (e.g., statuses of service nodes 106 that have not yet received the service request) and/or evaluate the service request itself (e.g., characteristics of the service request are suspicious). As one example, in the case that the evaluation by the classifier determines that a one or more service nodes 106 should be avoided, the classifier can dynamically update the topic chain to redirect the service request to one or more substitute service nodes 106. As another example, in the case that the evaluation by the classifier determines there may be something wrong with the service request (e.g., the service request appears to be suspicious), the classifier can dynamically update the topic chain to redirect the service request to an audit node.

A classifier incorporates a topic chain generated for a service request into a message and publishes the message to a first topic in the topic chain. Incorporating the topic chain in the message used to send a service request to a span of service nodes 106 enables each service node 106 to forward (republish) the message to a next topic in the topic chain, thereby providing the message to a next service node 106 in the span of service nodes, as will be described in greater detail later. As background, a message contains headers and a payload. The headers contain metadata about the message, and the payload contains the content of the message. In some embodiments, a topic chain for a service request is incorporated in the metadata of a message. For example, the message can be generated to include the topic chain in a metadata field of the message, and the service nodes 106 that receive the message read the metadata field to identify a next topic in the topic chain to republish the message. As an illustrative example, the message can comprise:

```
message PubSubMessage {
    string data = customer_order;
    string topic chain = "customer-service", "billing-service", "warehouse-
    management-service";
    ...
}
```

A service node 106 that receives the message above references the metadata field containing the topic chain to identify a next topic in the topic chain, and the service node 106 forwards (publishes) the message to the next topic, thereby providing the message containing the service request to a next service node 106 in the span of service nodes 106.

In other embodiments, a topic chain for a service request is incorporated in the payload of a message. The topic chain, in some examples, is included in the payload as key-value pairs, where the keys indicate the topic chain list or order, and the values indicate the topic names. As an illustrative example, the message can comprise:

```
message PubSubMessage {
    string data = { service_request : "customer_order"
        topic_1 : "customer-service",
        topic_2 : "billing-service",
        topic_3 : "warehouse-management-service";
    }
```

A service node 106 that receives the message above references key-value pairs to identify a next topic in the topic chain, and the service node 106 republishes the message to the next topic to provide the message containing the service request to a next service node 106 in the span of service nodes 106.

In some embodiments, as a message is forwarded from topic 112 to topic 112 included in a topic chain, the service nodes 106 modify the message to update the topic chain to include only the remaining topics to which the message has not yet been published. As one example, the service nodes 106 can update the topic chain in the message to remove a topic 112 from which the message was received and leave intact the remaining topics 112 in the topic chain to which the message has not yet been published. As another example, the service nodes 106 can determine from the topic chain included in a message, a next topic to which to publish the message, remove the next topic from the topic chain, and then publish the message to the next topic, such that as the message is forwarded from topic 112 to topic 112, the first position in the topic chain indicates the next topic to which to publish the message.

Figure 2:
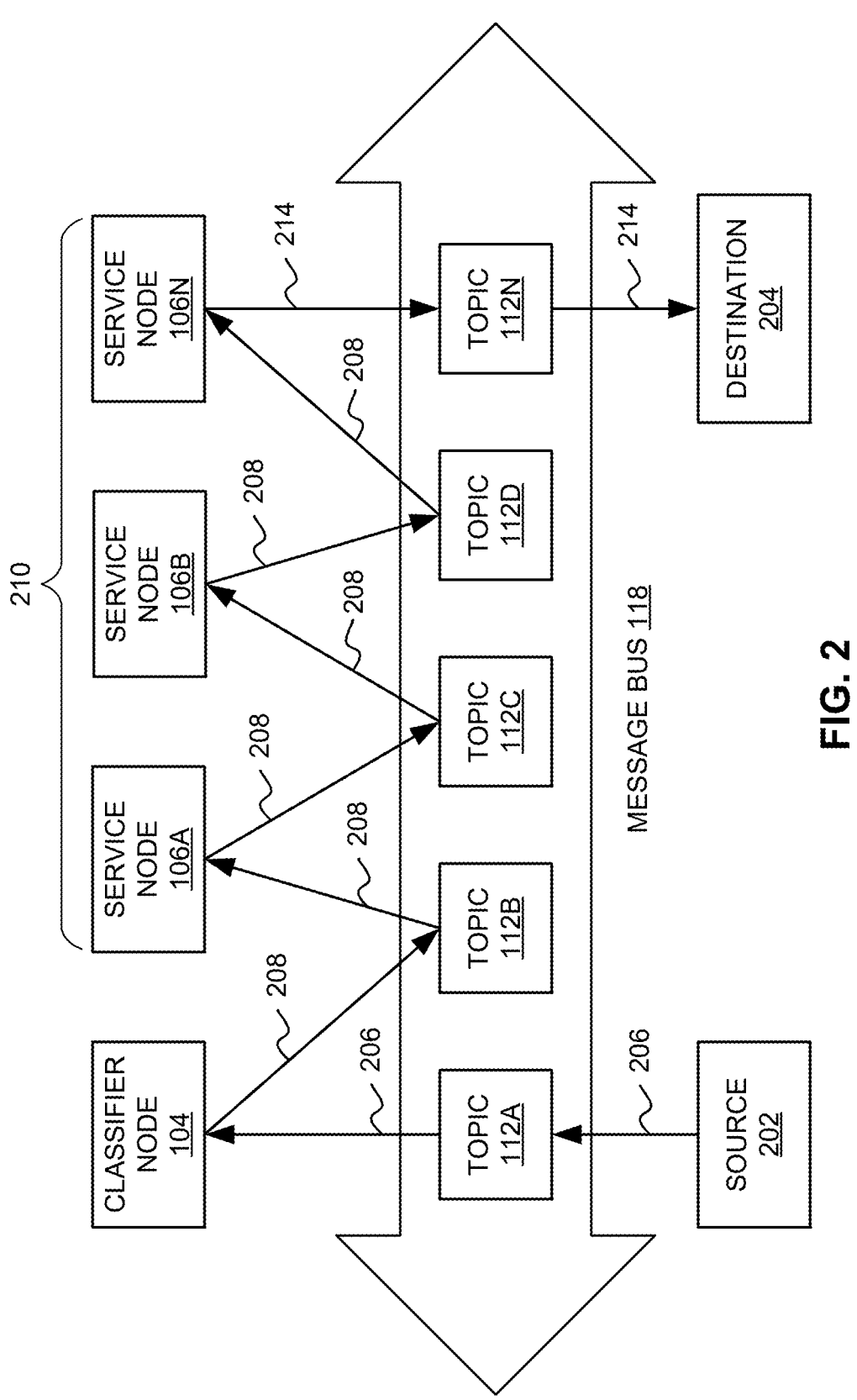
FIG. 2 is a diagram that illustrates one example of in-band service chaining, in accordance with some embodiments of the present disclosure.

With continued reference to FIG. 1, FIG. 2 is a diagram that illustrates one example of in-band service chaining using a classifier node 104 to generate a topic chain for a service request, in accordance with some embodiments of the present disclosure. The in-band service chaining is initiated at a source 202 of a service request 206, where the source 202 can be a client 108, a service, or any other entity that generates service requests for distributed applications and/or services. As illustrated, source 202 publishes the service request 206 (e.g., a message containing the service request) to topic 112A (e.g., classifier topic) managed by message bus 118. A classifier node 104, which is an independent node implemented to generate topic chains for services requests, subscribes to topic 112A to receive service requests published to topic 112A.

In response to receiving the service request 206, the classifier node 104 generates a topic chain for the service request 206. The classifier node 104 can generate the topic chain using either one of, the rule list technique or the dynamically generated list technique described earlier. The resulting topic chain indicates a sequence of topics 112B, 112C, 112D to which service nodes 106A, 106B, 106N (span of service nodes 210) subscribes, respectively.

After generating the topic chain, the classifier node 104 publishes a message 208 containing the service request 206 and the topic chain to a first topic 112B of the topic chain. As will be appreciated, a message containing the service request 206 published by the source 202 can be modified to include the topic chain. Publishing the message 208 to the first topic 112B provides the service request to a first service node 106A in the span of service nodes 210. In response to receiving the message 208, the first service node 106A performs an aspect of the service request 206 (e.g., executes code for a microservice), identifies the next topic 112C in the topic chain (e.g., via message metadata or key-value pair), and forwards the message 208 to the next topic 112C in the topic chain. This process is repeated by the remaining service nodes 106B, 106N in the span of service nodes 210 for the remaining topics in the topic chain. As will be appreciated, a service node 106 in the span of service nodes 210 can perform its part of the service request 206 and forward (publish) the message 208 to the next topic in the topic chain simultaneously. However, in some embodiments, a service node 106 may wait to forward the message 208 to the next topic until the service node 106 has completed its part of the service request 206.

As mentioned earlier, as the message 208 is forwarded to the topics 112 included in the topic chain, the service nodes 106, in some embodiments, update the topic chain to include only remaining topics to which the message 208 has not yet been published. The last service node 106N in the span of service nodes 210 to perform its part of the service request can publish a completed message 214 to topic 112N to indicate that the service request 206 has been completed, and a destination 204 (e.g., a client 108, a service, or another entity) can be provided with the completed message 214.

Although FIG. 2 illustrates a single classifier node 104, it will be appreciated that the in-band service chaining illustrated in FIG. 2 can include multiple classifier nodes 104 or multiple classifier evaluations. For example, a first classifier node can be provided to generate a topic chain for a first portion of a service request, and a second classifier node can be provided to generate a topic chain for a second portion of the service request. Moreover, although FIG. 2 shows a classifier node 104 as a first node in a sequence of nodes 104, 106A, 106B, 106N; a classifier node 104 can be placed anywhere within a sequence of nodes, and a sequence of nodes can include any number of classifier nodes 104.

Figure 3:
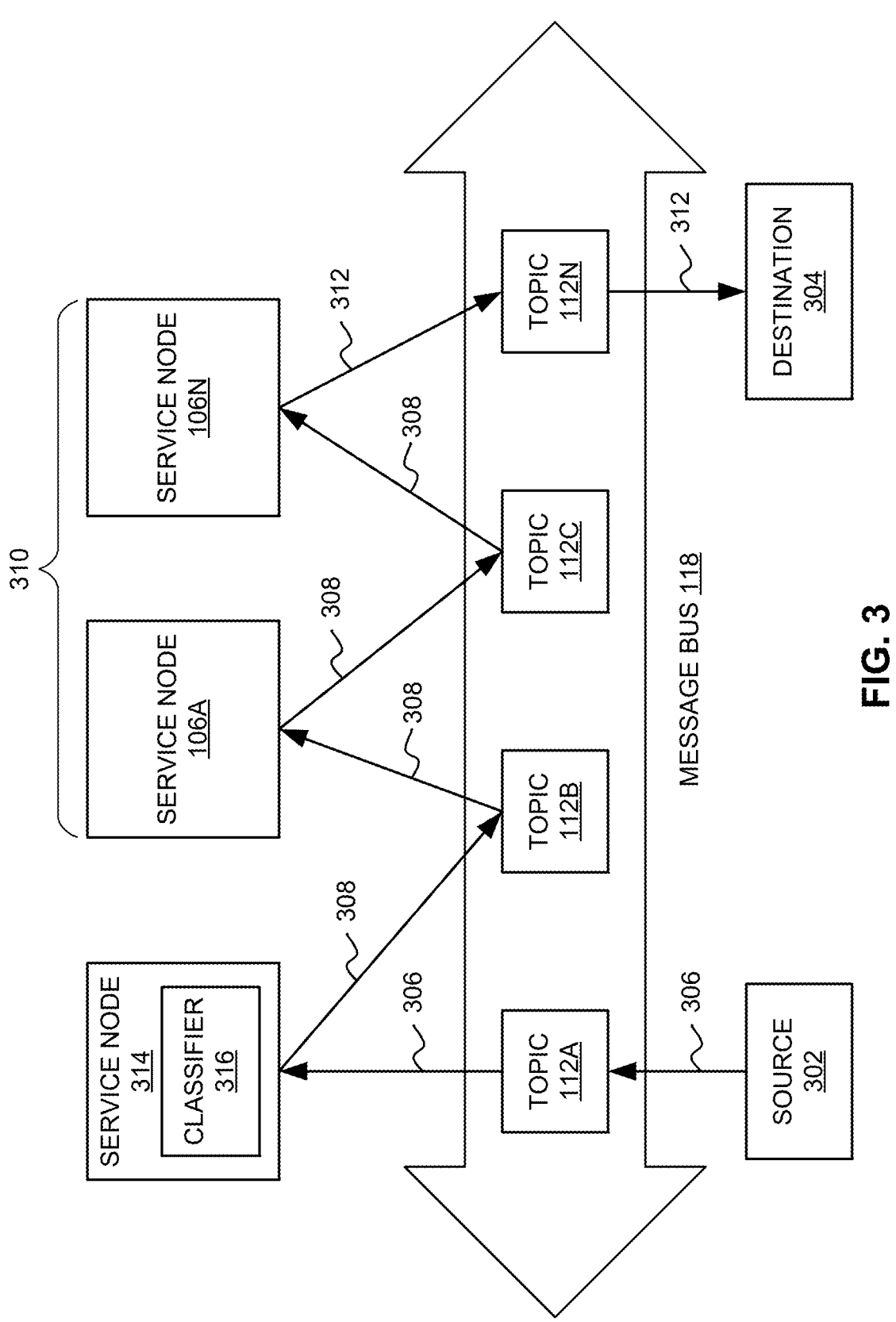
FIG. 3 is a diagram illustrating another example of in-band service chaining, in accordance with some embodiments of the present disclosure.

FIG. 3, with continued reference to FIG. 1, is a diagram that illustrates another example of in-band service chaining using a service node 314 configured with a classifier 316 to generate a topic chain for a service request, in accordance with some embodiments of the present disclosure. As described earlier, in some embodiments, a classifier 316 can be implemented in a service node 314 as a module, such that the service node 314 can act as both a microservice of a distributed application and a classifier 316 for generating topic chains for service requests 306 intended for the distributed application.

The service node 314 subscribes to topic 112A (e.g., service request topic) to receive service requests 306 published by source 302. In response to receiving a service request 306 at the service node 314, the service node 314 performs its part of the service request 306 and the classifier 316 generates a topic chain for the service request 306. Thereafter, the service node 314 publishes a message 308 containing the service request and the topic chain to a first topic 112B in the topic chain. The service nodes 106A, 106N included in a span of service nodes 310 forward message 308 down the chain of topics 112B, 112C indicated by the topic chain to enable the span of service nodes 310 to perform their corresponding parts of the service request 306. The last service node 106N in the span of service nodes 310 publishes a completed message 312 to topic 112N to indicate that the service request 306 has been completed, whereupon a destination 304 (e.g., a client 108, a service, or another entity) can be provided with the completed message 312.

Figure 4:
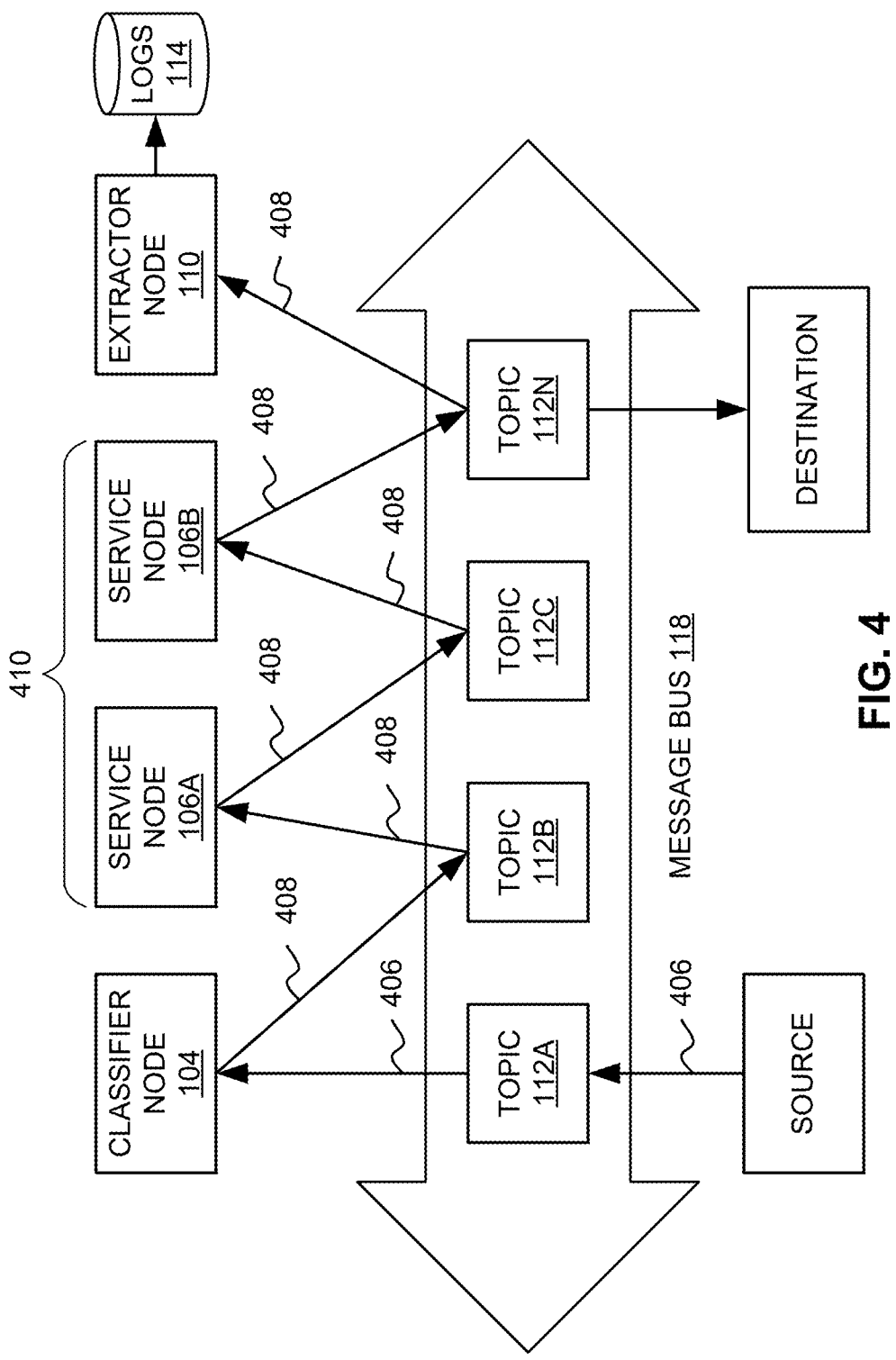
FIG. 4 is a diagram that illustrates extracting tracing information for a service request from a message, in accordance with some embodiments of the present disclosure.

FIG. 4, with continued reference to FIG. 1, is a diagram that illustrates extracting tracing information for a service request from a message, in accordance with some embodiments of the present disclosure. Prior to the present disclosure, performance monitoring and tracing of services in a distributed services environment was difficult due to loose coupling of the services. For example, prior to the present disclosure, each service included in a span of services would generate their own log for a service request, and at some time thereafter, the logs generated by the individual services would be stitched together to create a single log for the service request.

The present disclosure improves performance monitoring and tracing of services in a distributed services environment by recording tracing information in a message 408 that is forwarded from service node 106 to service node 106 in a span of service nodes 410, such that each service node 106 (or selected service nodes 106) records its own tracing information in the message 408 in the form of metadata. After completing the service request (or at any time prior to completing the service request), the message 408 can be provided to an extractor node 110 (or an extractor module implemented in a service node 106), and the extractor node 110 can extract the tracing information from the message 408 and log the tracing information.

An extractor node 110 can comprise an individual, self-contained, and loosely coupled service configured to process a message 408 to identify tracing information for a service request 406 recorded to the message 408 in the form of metadata and generate one or more logs from the tracing information. As an illustration, a message 408 created by a classifier node 104, as described earlier, can be provided to a span of service nodes 410. As part of performing its part of the service request 406, each service node 106 inserts tracing information (e.g., timestamps, service request ID, producer/consumer IDs, transformation context, and/or other information) that tracks and records the activity of the service node 106 into the header metadata or payload of the message 408 and forwards the message 408 to a next topic in the topic chain.

The tracing information can be extracted from the message 408 at any point in the service request span. For example, after at least a portion of the service request 406 has been completed, the message 408 can be provided to the extractor node 110 via a topic 112N to which the extractor node 110 subscribes. The extractor node 110 processes the message 408 to identify the tracing information recorded to the message 408, and the extractor node 110 creates one or more logs 114 (e.g., a service request log) using the tracing information obtained from the message 408. The extractor node 110 can store the log(s) 114 to the log datastore 116 shown in FIG. 1.

Although FIG. 4 illustrates a single extractor node 110, it will be appreciated that the in-band service chaining described herein can include any number of extractor nodes 110. Moreover, although FIG. 4 illustrates an extractor node 110 as a last node in a sequence of nodes 104, 106A, 106B, 110; it will be understood that an extractor node 110 can be placed anywhere within a sequence of nodes.

Figure 5:
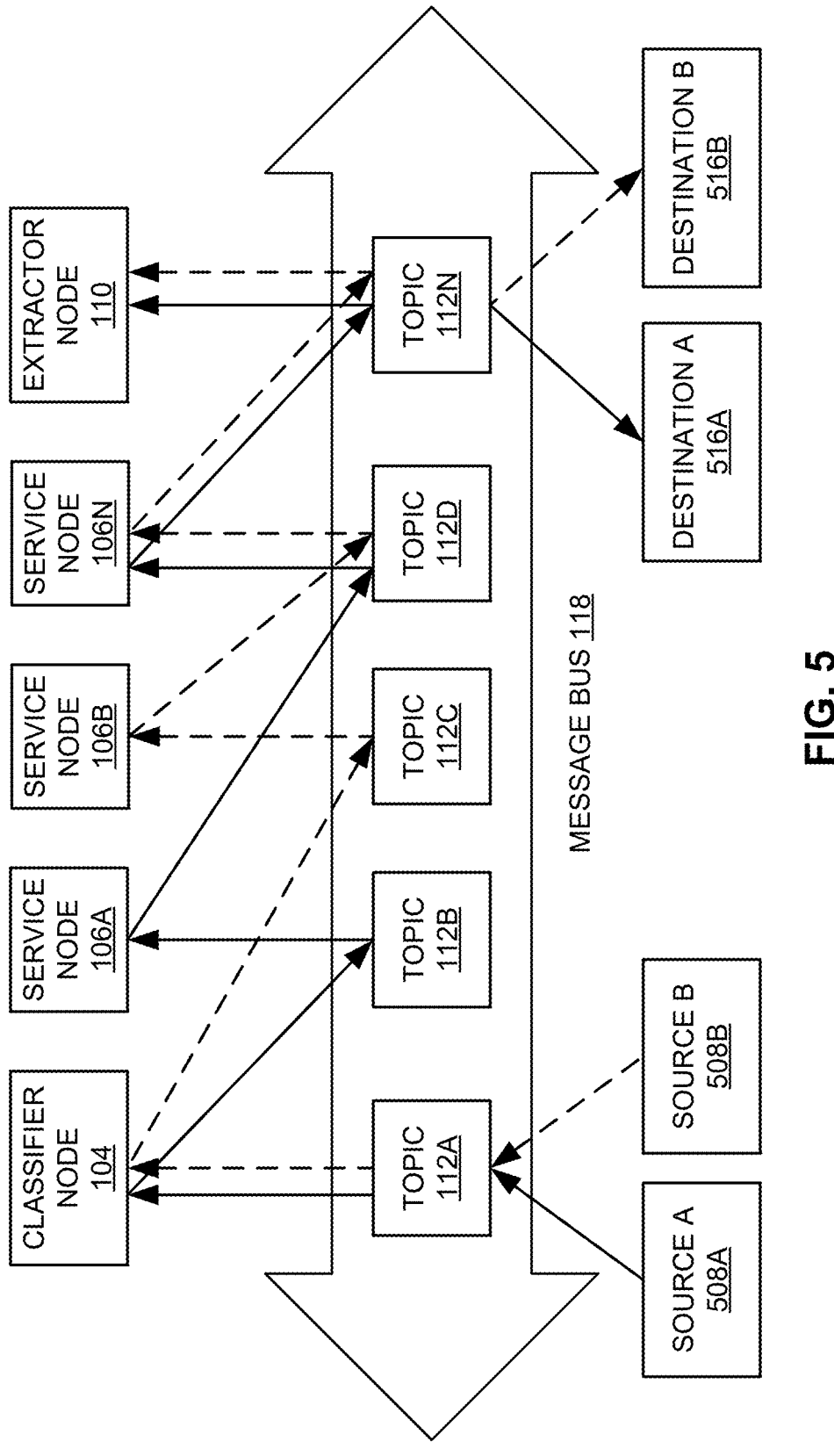
FIG. 5 is a diagram illustrating forwarding of service requests to different spans of service nodes using topic chains, in accordance with some embodiments of the present disclosure.

FIG. 5, with continued reference to FIG. 1, is a diagram illustrating forwarding of service requests to different spans of service nodes 106 using topic chains, in accordance with some embodiments of the present disclosure. As shown, both source 508A and source 508B can submit service requests to a topic 112A (e.g., classifier topic) to which a classifier node 104 (or a classifier module hosted by a service node 106) subscribes. The classifier node 104 evaluates each service request independently to determine a span of service nodes for performing the service request and generate a topic chain to indicate a sequence to topics 112 to which the span of service nodes subscribe.

As an illustrative example, a service request submitted by source 508A may be a customer order, and a service request submitted by source 508B may be a return order. The classifier node 104 evaluates each service request independently to determine a span of service nodes to handle the service request, and the classifier node 104 generates a topic chain for the service request.

For the customer order, the classifier node 104 determines that service requests classified as "customer orders" are handled by a customer order service and a warehouse management service, respectively. The classifier node 104 then identifies a service node 106A that provides the customer order service, and a service node 106N that provides the warehouse management service. The classifier node 104 then determines that service node 106A subscribes to the topic 112B "customer-orders" and service node 106N subscribe to the topic 112D "warehouse-management". Thereafter, the classifier node 104 generates a topic chain for the customer order to indicate the sequence of topics 112B, 112D. The classifier node 104 then publishes a message to the first topic 112B in the topic chain to include the customer order request and the topic chain. Service nodes 106A and 106N receive the message via the topics 112B and 112D, respectively, and perform tasks associated with accomplishing the customer order. Afterwards, an indication that the customer order request has been performed can be provided to destination 516A via topic 112N.

For the return order request, the classifier node 104 determines that service requests classified as "return orders" are handled by a customer return service and a warehouse management service, respectively. The classifier node 104 then identifies a service node 106B that provides the return order service, and a service node 106N that provides the warehouse management service. The classifier node 104 then determines that service node 106B subscribes to the topic 112C "return-orders" and service node 106N subscribes to the topic 112D "warehouse-management". The classifier node 104 then generates a topic chain for the return order to indicate the sequence of topic 112C, 112D. The classifier node 104 then publishes a message to the first topic 112C indicated by the topic chain to include the return order request and the topic chain. Service nodes 106B and 106N receive the message via topics 112C and 112D, respectively, and perform tasks associated with accomplishing the return order. Afterwards, an indication that the return order request has been performed can be provided to destination 516B via topic 112N.

At one or more points during, or after, performance of either service request, the message forwarded between the service nodes 106 can be provided to an extractor node 110, which processes the message to identify tracing information recorded to the message by the service nodes 106 that performed the service request. The extractor node 110 creates one or more logs for the service request using the tracing information extracted from the message.

In the illustrative examples, the same reference numeral may be used in more than one figure. This reuse of a reference numeral in different figures represents the same element in the different figures. As will be appreciated, the specific examples illustrated in the figures and discussed above are not meant to be limiting in any way. The aspects described by the present disclosure can be used with any distributed application and/or service that utilizes a messaging system to connect loosely coupled services by way of message busses and topics.

Figure 8:
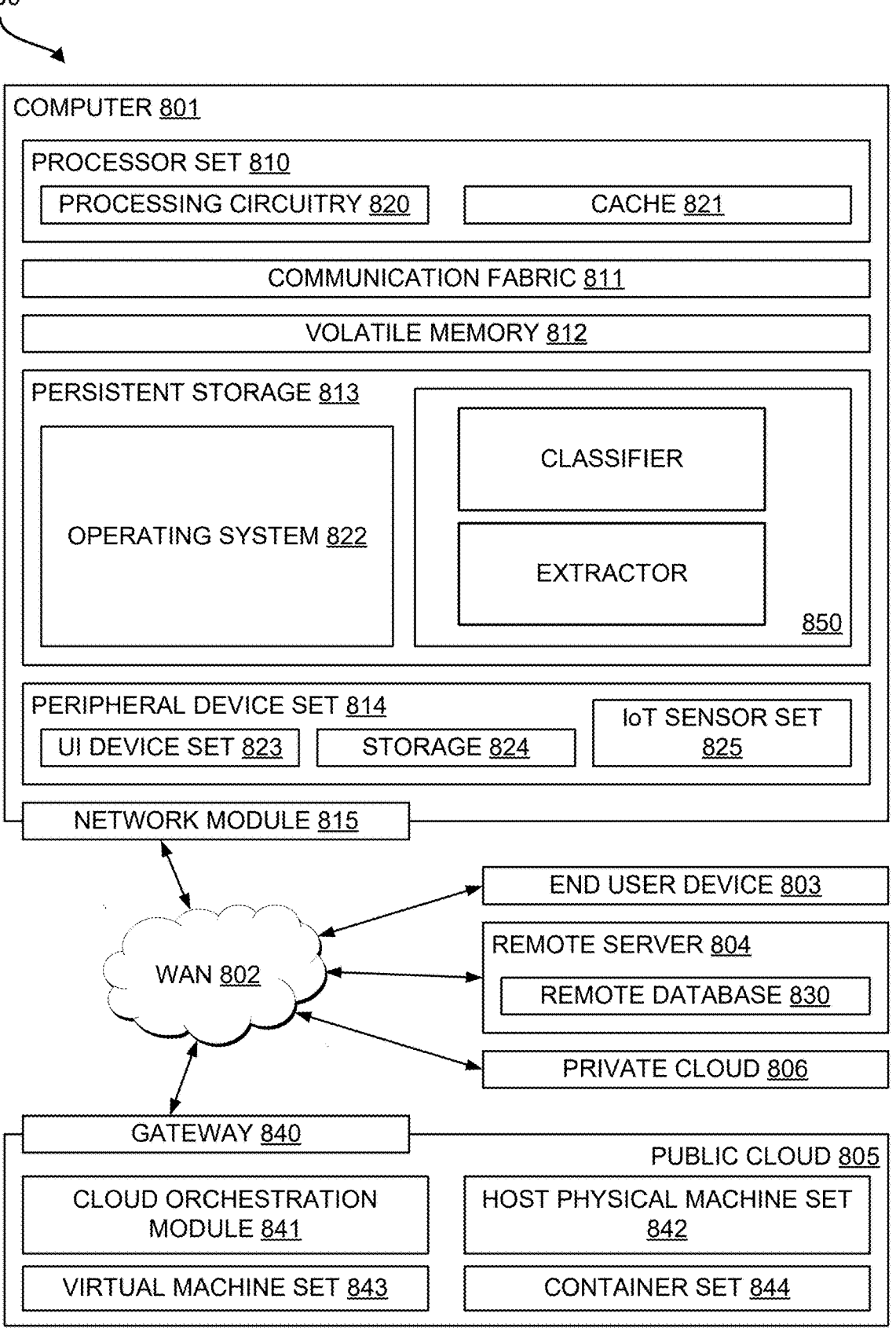
FIG. 8 is a block diagram that illustrates an example computing environment in which aspects of the present disclosure can be implemented, in accordance with some embodiments of the present disclosure.

All or a portion of the system 100 shown in FIG. 1 can be implemented, for example by all or a subset of the computing environment 800 of FIG. 8. In some embodiments, processing components of the system 100 can be implemented as modules. Generally, modules (also referred to as program modules and/or software modules) include routines, programs, components and/or data structures that perform particular tasks and/or implement particular abstract data types. In some embodiments, the modules can be implemented as computing services hosted in a cloud environment. For example, a module can be considered a service with one or more processes executing on a server or other computer hardware. Such services can provide a service application that receives requests and provides output to other services or consumer devices. An application programming interface (API) can be provided for each module to enable a first module to send requests to and receive output from a second module. Such APIs can also allow third parties to interface with the module and make requests and receive output from the modules.

The term "datastore" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the datastore may include storage systems such as a SAN (Storage Area Network), cloud storage network, volatile or non-volatile RAM, optical media, or hard-drive type media. The datastore may be representative of a plurality of datastores as can be appreciated.

While FIG. 1 illustrates an example of a system environment that can implement the techniques above, many other similar or different environments are possible. The illustrated embodiment is not meant to imply physical or architectural limitations to the manner in which the system can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Moving now to FIG. 6, a flow diagram illustrates an example method 600 for in-band service chaining using a topic chain, in accordance with some embodiments of the present disclosure. In operation 602, the method 600 generates a topic chain for a service request that spans a set of service nodes in a distributed services environment. The topic chain indicates a sequence of topics to publish the service request so as to provide the service request to the set of service nodes by way of the sequence of topics. The set of service nodes comprises an end-to-end sequence of service nodes (e.g., span of service nodes) that provide services (e.g., microservices) for performing individual tasks of the service request.

In some embodiments, the method 600 generates the topic chain for the service request using a rule list that corresponds to the service request. The rule list defines the sequence of topics for publishing the service request, thereby allowing the set of service nodes to accomplish the service request. In other embodiments, the method 600 dynamically generates the topic chain for the service request by obtaining status information for service nodes included in the distributed services environment, selecting individual service nodes to handle aspects of the service request based on the status information, and identifying topics to which the individual service nodes subscribe.

In some embodiments, the method 600 includes generating the topic chain at a classifier node implemented in the distributed services environment to generate topic chains for service requests. The service requests can be provided to the classifier node by way of a topic to which the classifier node subscribes. In other embodiments, the method 600 includes generating the topic chain at a service node that is included in the set of service nodes. The service node can be configured to act as both a service node to provide a microservice and a classifier to generate topic chains for service requests.

In operation 604, the method 600 publishes the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes. Accordingly, the message is published in sequence to one or more topics as indicated by the topic chain, so as to provide the service request to one or more service nodes in the set of service nodes that subscribe, respectively, to the one or more topics indicated by the topic chain.

In some embodiments, as part of publishing the service request and topic chain, the method 600 incorporates the topic chain in the metadata of the message, and publishes the message to the first topic in the topic chain. In other embodiments, the method 600 incorporates the topic chain in a payload field of the message as key-value pairs, and publishes the message containing the service request to the first topic in the topic chain.

After publishing the service request and topic chain to the first topic in the topic chain, the method 600 receives, by the first service node in the set of service nodes, the service request and the topic chain. In response, the method 600 performs, by the first service node, an aspect of the service request. In combination with performing the aspect of the service request, the method 600 identifies, by the first service node, a second topic in the topic chain, and publishes the service request and the topic chain to the second topic in the topic chain. In some embodiments, the method 600 also includes modifying the topic chain to indicate only remaining topics in the topic chain to which the message has yet to be published to.

FIG. 7 is a flow diagram illustrating an example method 700 for logging service requests in association with performing the in-band service chaining described in FIG. 6, in accordance with some embodiments of the present disclosure. In operation 702, the method 700 extracts tracing information for a service request from a message after at least a portion of the service request has been completed. For example, individual service nodes in a set of service nodes insert the tracing information into the message to track and record activities of the individual service nodes. At any point during the in-band service chaining process, the message can be published to a topic to which an extractor (e.g., an extractor node or an extractor module) subscribes, and the extractor can process the message to identify tracing information recorded to the message by the individual service nodes. In operation 704, the method 700 logs the service request using the tracing information extracted from the message. For example, the extractor can create a log for the service request using the tracing information extracted from the message and store the log to a logging datastore.

The methods described above in association with FIG. 6 and FIG. 7 can be performed by a computer (e.g., computer 801 in FIG. 8), performed in a cloud environment (e.g., clouds 806 or 805 in FIG. 8), and/or generally can be implemented in fixed-functionality hardware, configurable logic, logic instructions, etc., or any combination thereof.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage media or medium, as the terms are used in the present disclosure, are not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the disclosed methods, such as computer code in block 850 for a classifier, a combination of a classifier and microservice, and/or an extractor. In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 821 and the other storage media discussed below. The computer readable program instructions, and associated data, are accessed by processor set 810 to control and direct performance of the disclosed methods. In computing environment 800, at least some of the instructions for performing the disclosed methods may be stored in block 850 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open-source Portable Operating System Interface type operating systems that employ a kernel. The code included in block 850 typically includes at least some of the computer code involved in performing the disclosed methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the disclosed methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (e.g., a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items. Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A computer-implemented method comprising:

generating a topic chain for a service request that spans a set of service nodes in a distributed services environment, wherein the topic chain indicates a sequence of topics to publish the service request so as to provide the service request to the set of service nodes by way of the sequence of topics; and publishing the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes.

2. The computer-implemented method of claim 1, wherein generating the topic chain for the service request further comprises:

identifying a rule list that corresponds to the service request, wherein the rule list defines the sequence of topics for publishing the service request to allow the set of service nodes to accomplish the service request; and generating the topic chain to indicate the sequence of topics defined by the rule list.

3. The computer-implemented method of claim 1, wherein generating the topic chain for the service request further comprises:

obtaining status information for service nodes in the distributed services environment;

selecting individual service nodes to handle aspects of the service request based on the status information;

identifying topics to which the individual service nodes subscribe; and generating the topic chain to indicate the topics.

4. The computer-implemented method of claim 1, wherein generating the topic chain for the service request further comprises:

generating the topic chain at a classifier node implemented in the distributed services environment to generate topic chains for service requests, wherein the service requests are provided to the classifier node by way of a topic to which the classifier node subscribes.

5. The computer-implemented method of claim 1, wherein generating the topic chain for the service request further comprises:

generating the topic chain at a service node included in the set of service nodes, wherein the service node is configured to act as both a service node to provide a microservice and a classifier to generate topic chains for service requests.

6. The computer-implemented method of claim 1, wherein publishing the service request and the topic chain further comprises:

incorporating the topic chain in metadata of the message for publishing the service request to the set of service nodes.

7. The computer-implemented method of claim 1, wherein publishing the service request and the topic chain further comprises:

incorporating the topic chain in a payload field of the message of the service request as key-value pairs.

8. The computer-implemented method of claim 1, further comprising:

receiving, at a service node in the set of service nodes, the message containing the service request and the topic chain;

performing an aspect of the service request that corresponds to the service node;

identifying a next topic in the topic chain; and publishing the message containing the service request and the topic chain to the next topic.

9. The computer-implemented method of claim 8, wherein identifying the next topic in the topic chain further comprises:

modifying, by the service node, the topic chain to indicate remaining topics in the topic chain to which the message has yet to be published.

10. The computer-implemented method of claim 8, further comprising:

inserting, by the service node, tracing information into the message, where the tracing information tracks and records activities of the service node related to performing the service request.

11. The computer-implemented method of claim 10, further comprising:

extracting, at an extractor node, the tracing information for the service request from the message after at least a portion of the service request has been completed; and logging the service request using the tracing information extracted from the message.

12. A system comprising:

one or more computer readable storage media storing program instructions and one or more processors which, in response to executing the program instructions, are configured to:

generate a topic chain for a service request that spans a set of service nodes in a distributed services environment, wherein the topic chain indicates a sequence of topics to publish the service request so as to provide the service request to the set of service nodes by way of the sequence of topics; and publish the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes.

13. The system of claim 12, wherein the program instructions configured to cause the one or more processors to generate the topic chain for the service request are further configured to cause the one or more processors to:

obtain status information for service nodes in the distributed services environment;

select individual service nodes to handle aspects of the service request based on the status information;

identify topics to which the individual service nodes subscribe; and generate the topic chain to indicate the topics.

14. The system of claim 12, wherein the program instructions are further configured to cause the one or more processors to:

receive, at a service node in the set of service nodes, the message containing the service request and the topic chain;

perform an aspect of the service request that corresponds to the service node;

modify the topic chain to indicate remaining topics in the topic chain to which the message has yet to be published; and publish the message containing the service request and the topic chain to a next topic in the topic chain.

15. The system of claim 12, wherein the program instructions are further configured to cause the one or more processors to:

receive, at a service node in the set of service nodes, the message containing the service request and the topic chain;

perform an aspect of the service request that corresponds to the service node;

insert, by the service node, tracing information into the message, where the tracing information tracks and records activities of the service node related to performing the service request; and publish the message containing the tracing information to a next topic in the topic chain.

16. The system of claim 15, wherein the program instructions are further configured to cause the one or more processors to:

receive the message containing the tracing information at an extractor node after at least a portion of the service request has been completed;

extract the tracing information for the service request from the message; and log the service request using the tracing information extracted from the message.

17. A computer program product comprising:

one or more computer readable storage media, and program instructions collectively stored on the one or more computer readable storage media, the program instructions configured to cause one or more processors to:

generate a topic chain for a service request that spans a set of service nodes in a distributed services environment, wherein the topic chain indicates a sequence of topics to publish the service request so as to provide the service request to the set of service nodes by way of the sequence of topics; and publish the service request and the topic chain in a message to a first topic indicated by the topic chain to provide the service request and the topic chain to a first service node in the set of service nodes, and to allow the first service node to subsequently publish the message to a second topic indicated by the topic chain, so as to provide the service request and topic chain to a second service node in the set of service nodes.

18. The computer program product of claim 17, wherein the program instructions configured to cause the one or more processors to generate the topic chain for the service request are further configured to cause the one or more processors to:

obtain status information for service nodes in the distributed services environment;

select individual service nodes to handle aspects of the service request based on the status information;

identify topics to which the individual service nodes subscribe; and generate the topic chain to indicate the topics.

19. The computer program product of claim 17, wherein the program instructions are further configured to cause the one or more processors to:

receive, at a service node in the set of service nodes, the message containing the service request and the topic chain;

perform an aspect of the service request that corresponds to the service node;

modify the topic chain to indicate remaining topics in the topic chain to which the message has yet to be published; and publish the message containing the service request and the topic chain to a next topic in the topic chain.

20. The computer program product of claim 17, wherein the program instructions are further configured to cause the one or more processors to:

receive, at a service node in the set of service nodes, the message containing the service request and the topic chain;

perform an aspect of the service request that corresponds to the service node;

insert, by the service node, tracing information into the message, where the tracing information tracks and records activities of the service node related to performing the service request to allow an extractor node to extract the tracing information for the service request from the message and log the service request using the tracing information; and publish the message containing the tracing information to a next topic in the topic chain.

* * * * *